May 23, 1950      D. C. WARREN      2,509,118
SWIVEL CONNECTION
Filed April 10, 1946
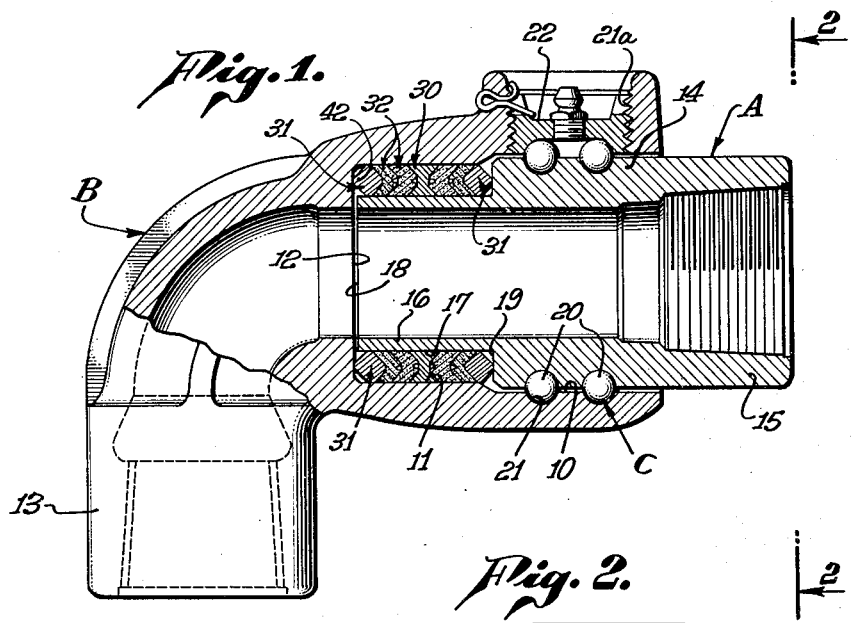
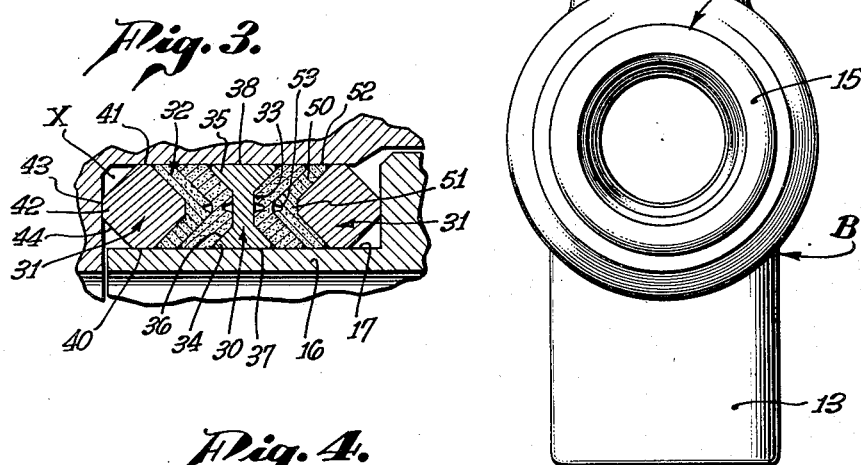
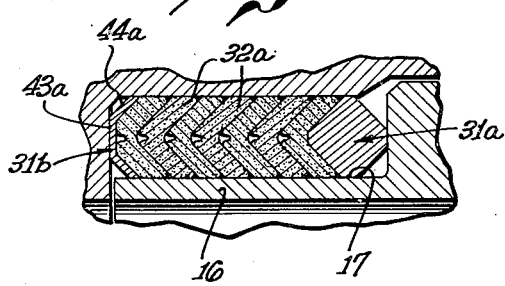
INVENTOR.
Doyle C. Warren
BY
ATTORNEY Patented May 23, 1950

2,509,118

UNITED STATES PATENT OFFICE 2,509,118

SWIVEL CONNECTION

Doyle C. Warren, Monrovia, Calif., assignor to Chiksan Company, Brea, Calif., a corporation of California Application April 10, 1946, Serial No. 661,095

1 Claim. (Cl. 285—97.3)

This invention has to do with a packing assembly for swivel connections and it is a general object of the invention to provide a simple, inexpensive, improved packing assembly for sealing between two parts such as the male and female sections of a swivel joint, which assembly involves but few simple inexpensive yet highly effective parts.

A general object of the present invention is to provide a packing assembly suitable for application to an elongate annular packing chamber established between two swivelly connected parts, which assembly can be arranged to face in either direction in the chamber.

Another object of the invention is to provide a packing assembly of the general character referred to which is double acting, that is, which involves two sets of sealing rings, the rings of the two sets being oppositely faced so that the packing is effective in sealing against flow or leakage in either direction between the connected parts.

It is another object of the invention to provide a simple, improved form of sealing ring with diverging sealing flanges or side parts connected so that they are free to work or move relative to each other to seal in a most effective manner.

The various objects and features of my invention will be fully understood from the following detailed description of typical preferred forms and applications of the invention, throughout which description reference is made to the accompanying drawings, in which:

Fig. 1 is a longitudinal detailed sectional view of a typical swivel joint showing the packing of the present invention in operating position therein. Fig. 2 is a view of the joint taken as indicated by line 2—2 on Fig. 1. Fig. 3 is an enlarged detailed view of a portion of the structure shown in Fig. 1, showing the packing assembly in detail, and Fig. 4 is a view similar to Fig. 3 showing a modified form of packing assembly.

The packing assembly of the present invention is particularly suited for use in swivel joints or the like and in the typical adaptation illustrated there is a swivel joint involving, generally, a male section A and a female section B. The sections A and B are joined or held together by suitable bearing means C and the packing assembly of the present invention acts between the sections to effect a seal between them.

The female section B of the joint is shown in the form of an L while the male section is a straight tubular part engaged in one end of the female section. The socket or opening provided in one end of the female section for the reception of the male section has an outer bearing portion 10 and an inner packing carrying portion 11. The packing carrying portion of the socket in the female section has a straight finished cylindrical side wall and has a flat inner end wall 12 in a plane normal to the longitudinal axis of the joint. The other or second end portion 13 of the female section extends at right angles to the portion having the socket above described so that the section B is in the nature of an L.

The male section is a straight tubular part with a central bearing portion 14, an outer or projecting end portion 15 and an inner end portion 16. The inner end portion 16 is in the nature of a turned extension on the inner end of the central portion 14 and it has its outer surface 17 turned and concentric with the bore or wall 11 of the inner portion of the female socket. The inner end 18 of the inner portion 16 terminates just short of the shoulder 12 as shown in Fig. 1. A flat shoulder 19 lying in a plane normal to the longitudinal axis of the joint occurs where the bearing section 14 and the inner section 16 join, the shoulder 19 being opposed to the end or bottom 12 of the socket in the female section. The inner end portion 16 of the male section is substantially smaller in diameter than the inner end portion 11 of the socket in the female section, with the result that there is a substantial space or chamber X formed between these parts which chamber is annular in form and is of substantial length axially of the structure, as shown in the drawings.

The means C serves to rotatably connect the sections A and B and in the particular case illustrated it is in the nature of a series of balls 20 carried in registering grooves 21 provided in the bearing portions of the sections A and B. The balls are arranged in place through an opening 21ª normally closed by a removable plug 22. The balls 20 serve to connect the sections A and B so that they are freely rotatable relative to each other and are effectively held against relative movement axially.

The packing assembly that I have provided is carried in or occupies the chamber X above described. The form of packing assembly shown in Figs. 1 and 3 of the drawings is double acting and involves, generally, a central partition ring 30, end rings 31 and two sets of packing rings arranged between the partition ring and the end rings, each set of packing rings including a plurality of packing rings 32 faced in one direction axially of the joint and the two sets of packing rings being faced in opposite directions, preferably both away from the partition ring 30, as shown in the drawings.

The partition ring 30 has flat end faces 33 in planes normal to the axis of the joint and at each end face it has an inner flange 34 and an outer flange 35 the flanges being formed with pitched or inclined faces 36 so that the flanges combine with the ring 30 to present flat bottomed V-shaped channels at each end of the partition ring to receive the innermost packing rings of the packing sets. The partition ring has a bore 37 receiving the inner portion 16 of the male section A with suitable clearance and its periphery or exterior 38 is turned to fit into the inner portion 11 of the socket in section B with suitable clearance so that the partition ring floats or is free to move either axially or rotatably in the chamber X.

The end rings 31 are preferably alike and each has a bore 40 receiving the projection 16 with suitable clearance and its exterior 41 is turned to fit into the inner portion 11 of the socket with suitable clearance. Projections 42 are provided at each end or side of each ring 31 and each projection has a narrow central flat end face 43 and inclined faces 44 that are pitched or inclined in opposite directions from the face 43 so that each projection is in the nature of a tapered part that will fit into the outermost packing ring of a packing set.

The partition ring 30 and the end rings 31 are preferably formed of metal.

The two sets of packing rings are preferably alike except for being oppositely faced or disposed and each set of rings preferably includes a plurality of like or similar packing rings. In the preferred form of the invention the innermost packing ring, that is, the ring which bears against the partition ring 30, is preferably somewhat thicker or heavier than the other or outer packing rings. In the case shown in Figs. 1 and 3 of the drawings each set involves two packing rings, a thick inner packing ring and a thin outer packing ring, whether thick or thin, involves, generally, an annular body of packing material such as rubber or a rubber-like composition and it is made V-shaped in cross sectional configuration so that it has diverging side flanges 50 which extend from a common central portion 51. The flanges 50 of the packing rings extend in directions parallel with the inclined faces 36 of the partition ring and 44 of the end rings, and the outer ends 52 of the flanges are preferably finished and shaped to have sealing engagement with the wall of the inner socket portion 11 and the exterior 17 of the inner portion 16 of the section A. In the preferred form of the invention the central portion 51 of each ring is weakened or made flexible as by a groove 53 so that the flange parts 50 are free to move or flex relative to each other in order to bring their outer ends 50 into proper seating engagement. In practice I may form the sealing rings of various materials and I have found that for most purposes so-called synthetic rubber materials are satisfactory as such materials may be made with the desired flexibility, are such as to effectively nest or seat together and against the rings of the packing assembly, and are readily formed with surfaces 52 that will effectively seal when the packing is in use.

When the packing assembly is in operating position as shown in the drawings, the outermost projections on the end rings 31 seat or bear against the inner end 12 and shoulder 19 of sections B and A, respectively, while the oppositely faced sets of packing rings face the end rings and have their outermost rings fitted over the projections at the inner ends of the end rings. The innermost ends of the sets of packing rings seat in the channels in the partition ring 30. It is preferred that the parts be arranged and proportioned so that the packing rings are held in place with some pressure, that is, so that the packing assembly is held snugly in the chamber X, and by providing the grooves 53 in the packing rings I provide space into which the rings can be somewhat compressed, if necessary, rather than causing the rings to be mashed out of shape or be deformed to the point where they are not effective. It will be apparent from Figs. 1 and 3 of the drawings that when the structure that I have described is in operation the sets of packing rings being faced in opposite directions are effective in sealing against leakage or flow in either direction and, consequently, they are effective in preventing leakage out of the joint as well as into the joint.

In the form of the invention shown in Fig. 4 I employ a single set of packing rings 32ᵃ and the end ring 31ᵃ at one end of the set or at the concave end of the set of sealing rings may be the same as the end ring above described, while I prefer that the end ring 31ᵇ at the other end of the set of sealing rings be somewhat different in form. The end ring 31ᵇ is made to fit the outer or convex side of the endmost sealing ring and instead of being formed as above described it has a central portion 43ᵃ which fits the connecting portion of the endmost ring and has diverging side portions or flanges 44ᵃ which are pitched like the faces 44 of the rings 31 and which fit against the flanges of the endmost packing ring. By using an end ring 31ᵇ such as I have just described I am able to employ more packing rings in a given chamber X than is possible if I use rings of the form first described at both ends of the structure.

Having described only typical preferred forms and application of my invention, I do not wish to be limited or restricted to the specific details herein set forth, but wish to reserve to myself any variations or modifications that may appear to those skilled in the art and fall within the scope of the following claim:

Having described my invention, I claim:

In combination, two tubular sections, one a female section with a socket terminating at an axially faced shoulder, and the other a male section entered in the socket and having a reduced inner end portion forming an axially faced shoulder spaced from the first mentioned shoulder, anti-friction means coupling the sections for relative rotation, and sealing means on said portion of the male section between the shoulders and including, a rigid partition ring surrounding said portion and having inwardly convergent cavities in its sides, a set of sealing rings at each side of the partition ring including rings of sealing material V-shaped in cross sectional configuration and nested together and into a cavity of the partition ring, and end rings at the ends of the sealing means having inner sides that are convergent and which are nested in the sealing rings, the outer sides of the end rings being convergent and terminating in narrow central annular bearing portions that bear on the shoulders, the sealing rings having thin sealing lips at their inner and outer peripheries engaged with the wall of the socket and the exterior of said portion of the male section.

DOYLE C. WARREN.

REFERENCES CITED

The following references are of record in the file of this patent:

UNITED STATES PATENTS

| Number | Name | Date |
|---|---|---|
| 1,676,391 | Humason et al. | July 10, 1928 |
| 2,088,771 | Smith | Aug. 3, 1937 |
| 2,284,340 | Nuckles | May 26, 1942 |
| 2,382,375 | Allen et al. | Aug. 14, 1945 |
| 2,388,841 | Goodwin | Nov. 13, 1945 |
| 2,396,123 | Phillips | Mar. 5, 1946 |